United States Patent
Nawaji et al.

(10) Patent No.: US 12,491,760 B2
(45) Date of Patent: Dec. 9, 2025

(54) TUBULAR VIBRATION DAMPING DEVICE

(71) Applicant: Sumitomo Riko Company Limited, Aichi (JP)

(72) Inventors: Mutsuki Nawaji, Aichi (JP); Takayoshi Yasuda, Aichi (JP)

(73) Assignee: Sumitomo Riko Company Limited, Aichi (JP)

( * ) Notice: Subject to any disclaimer, the term of this patent is extended or adjusted under 35 U.S.C. 154(b) by 385 days.

(21) Appl. No.: 18/348,324

(22) Filed: Jul. 6, 2023

(65) Prior Publication Data

US 2024/0083236 A1    Mar. 14, 2024

(30) Foreign Application Priority Data

Sep. 13, 2022   (JP) ................................ 2022-145285

(51) Int. Cl.
    *B60K 5/12*       (2006.01)

(52) U.S. Cl.
    CPC .......... *B60K 5/1225* (2013.01); *B60K 5/1266* (2013.01)

(58) Field of Classification Search
    CPC ............................ B60K 5/1225; B60K 5/1266
    See application file for complete search history.

(56) References Cited

U.S. PATENT DOCUMENTS

2001/0024006 A1\*   9/2001   Murai .................... F16F 13/14
                                                        267/141
2019/0360551 A1\*   11/2019   Yamada ............. F16F 13/1454

FOREIGN PATENT DOCUMENTS

| GB | 2412712 A | \* | 10/2005 | ............ F16F 1/3835 |
| JP | 2015161356 | | 9/2015 | |
| WO | WO-2014156515 A1 | \* | 10/2014 | ............... F16F 13/16 |

OTHER PUBLICATIONS

WO-2014156515-A1: English Machine Translation (Year: 2014).\*

\* cited by examiner

*Primary Examiner* — Melanie Torres Williams
(74) *Attorney, Agent, or Firm* — JCIPRNET (57) ABSTRACT

A tubular vibration damping device has a structure in which an inner shaft member is connected with an outer tube member made of synthetic resin by a body rubber elastic body. The outer tube member has a structure in which a tubular part extends in an axial direction from an inner peripheral end of a flange of an annular plate shape. A press fit rubber is fixed to an outer peripheral surface of the tubular part, and an axial surface of the flange on a side from which the tubular part extends is exposed without being covered with the press fit rubber. A notch penetrating in a radial direction is provided at an axial end of the outer tube member that includes the flange. A connecting rubber that connects the body rubber elastic body and the press fit rubber is provided in the notch.

5 Claims, 7 Drawing Sheets

TUBULAR VIBRATION DAMPING DEVICE

CROSS-REFERENCE TO RELATED APPLICATIONS

This application claims the priority benefit of Japan Application No. 2022-145285, filed on Sep. 13, 2022. The entirety of the above-mentioned patent application is hereby incorporated by reference herein and made a part of this specification.

BACKGROUND

Technical Field

The disclosure relates to a tubular vibration damping device applied to an engine mount of an automobile or the like.

Related Art

Conventionally, a tubular vibration damping device has been adopted as an engine mount or subframe mount, a suspension bush or the like of an automobile. The tubular vibration damping device has, for example, a structure in which an inner shaft member and an outer tube member are connected by a body rubber elastic body, as disclosed in Japanese Patent Laid-Open No. 2015-161356 (Patent Document 1) and so on.

A conventional outer tube member is made of metal. However, for purposes such as reduction of weight of the tubular vibration damping device, it has been studied to replace a metal outer tube member with a resin outer tube member. Patent Document 1 also illustrates an outer tube member made of synthetic resin as an example.

However, if an outer tube member to be attached to another member such as a vehicle body by being press fitted into a mounting hole is made of resin, plastic deformation is likely to occur due to the fact that stress caused by press fitting into the mounting hole acts continuously, and there is a possibility that a press fitting reaction force may decrease due to settling of the outer tube member.

Accordingly, in Patent Document 1, a press fit rubber is provided on an outer peripheral surface of the outer tube member. Since elasticity of the press fit rubber causes a fixing force of the outer tube member to the mounting hole to be exerted, settling of the outer tube member made of resin is less likely to affect the fixing force by press fitting into the mounting hole.

However, in the structure of Patent Document 1, since a surface of a flange provided in the outer tube member is covered with a covering rubber for integrally connecting the press fit rubber and the body rubber elastic body, it is conceivable that relative positions of the outer tube member and the mounting hole in an axial direction may vary due to elasticity of the covering rubber interposed between the flange and the mounting hole.

SUMMARY

According to one aspect of the disclosure, a tubular vibration damping device has a structure in which an inner shaft member is connected with an outer tube member made of synthetic resin by a body rubber elastic body. The outer tube member has a structure in which a tubular part extends in an axial direction from an inner peripheral end of a flange of an annular plate shape. A press fit rubber is fixed to an outer peripheral surface of the tubular part, and an axial surface of the flange on a side from which the tubular part extends is exposed without being covered with the press fit rubber. A notch penetrating in a radial direction is provided at an axial end of the outer tube member that includes the flange. A connecting rubber that connects the body rubber elastic body and the press fit rubber is provided in the notch.

DESCRIPTION OF THE EMBODIMENTS

The disclosure provides a tubular vibration damping device of a structure in which an outer tube member made of synthetic resin and a mounting hole can be accurately positioned in an axial direction while a press fit fixing force of the outer tube member to the mounting hole is stably exerted.

Described below are aspects for understanding of the disclosure. However, the aspects described below are exemplary and may be adopted in combination with each other as appropriate. Moreover, components described in each aspect may be recognized and adopted independently wherever possible, and may be adopted in combination with any component described in another aspect as appropriate. Accordingly, in the disclosure, various different aspects may be realized and the disclosure is not limited to the aspects described below.

According to one aspect, a tubular vibration damping device has a structure in which an inner shaft member is connected with an outer tube member made of synthetic resin by a body rubber elastic body. The outer tube member has a structure in which a tubular part extends in an axial direction from an inner peripheral end of a flange of an annular plate shape. A press fit rubber is fixed to an outer peripheral surface of the tubular part, and an axial surface of the flange on a side from which the tubular part extends is exposed without being covered with the press fit rubber. A notch penetrating in a radial direction is provided at an axial end of the outer tube member that includes the flange. A connecting rubber that connects the body rubber elastic body and the press fit rubber is provided in the notch.

According to the tubular vibration damping device configured according to the present aspect, the press fit rubber is fixed to the outer peripheral surface of the tubular part of the outer tube member made of synthetic resin. When the outer tube member is inserted into a mounting hole, the press fit rubber is compressed in the radial direction between the outer tube member and a peripheral wall of the mounting hole, and the outer tube member is fixed into the mounting hole by elasticity of the press fit rubber. By adopting such a rubber press fitting structure, plastic deformation (settling) of the outer tube member made of synthetic resin over time is less likely to affect a fixing force of the tubular vibration damping device to the mounting hole, and a stable mounting state of the tubular vibration damping device with respect to the mounting hole is maintained.

The press fit rubber is not fixed to the flange of the outer tube member that overlaps an opening end face of the mounting hole, and the exposed flange directly overlaps the opening end face of the mounting hole. Hence, no rubber is compressed between overlapping surfaces of the flange and the opening end face of the mounting hole, and positional deviation or the like of the outer tube member toward a side where the outer tube member falls out of the mounting hole due to elasticity of the rubber is prevented.

In the present aspect, by the connecting rubber provided in the notch formed at the axial end of the outer tube member that includes the flange, the body rubber elastic body and the press fit rubber are connected. Accordingly, it is possible to integrally form the body rubber elastic body and the press fit rubber without covering the overlapping surface of the flange on the opening end face of the mounting hole with rubber. Since the notch is provided at a rear end in a press fitting direction of the tubular vibration damping device into the mounting hole, in an initial stage of press fitting of the tubular vibration damping device into the mounting hole, it can be prevented that the notch or the connecting rubber is caught by an inner surface of the mounting hole or the like and resistance is increased.

According to another aspect, in the tubular vibration damping device described above, the connecting rubber is provided in the notch without protruding axially outward with respect to the flange.

For example, if the connecting rubber protrudes from the flange toward a side overlapping the opening end face of the mounting hole, due to the elasticity of the connecting rubber pressed against the opening end face of the mounting hole, there is a possibility that the position of the outer tube member in the axial direction with respect to the mounting hole may deviate. If the connecting rubber protrudes from the flange toward a side opposite the side overlapping the opening end face of the mounting hole, for example, in the case of pushing the flange in the axial direction to press fit the outer tube member into the mounting hole, there is a possibility that a press fitting force may be less likely to reach the flange due to the connecting rubber that protrudes axially outward from the flange. According to the tubular vibration damping device configured according to the present aspect, problems such as those described above may be solved, and the connecting rubber is less likely to interfere with positioning of the outer tube member and the mounting hole in the axial direction or application of force to the flange during press fitting or the like.

According to another aspect, in the tubular vibration damping device described above, a pair of hollowed holes are formed on both radial sides of the inner shaft member in the body rubber elastic body. The body rubber elastic body is provided with a pair of rubber arms each extending in the radial direction between the pair of hollowed holes in a circumferential direction and connecting the inner shaft member and the outer tube member to each other. The connecting rubber is arranged on an outer peripheral side of each of the rubber arms.

According to the tubular vibration damping device configured according to the present aspect, since the connecting rubber is provided on the outer peripheral side of the pair of rubber arms, integral formation of the rubber arm, the connecting rubber and the press fit rubber is facilitated when the body rubber elastic body is subjected to vulcanization molding.

According to another aspect, in the tubular vibration damping device described above, an outer peripheral protrusion of the connecting rubber protruding toward an outer periphery from the press fit rubber is provided between circumferential ends of the flange in the notch. An injection gate mark of a rubber material during molding of the connecting rubber is formed in the outer peripheral protrusion.

According to the tubular vibration damping device configured according to the present aspect, by directly injecting the rubber material into a cavity of the outer peripheral protrusion having at least a portion thereof located on the outer periphery of the press fit rubber during vulcanization molding of the rubber, the press fit rubber fixed to the outer peripheral surface of the tubular part can be molded with good filling properties of the rubber material.

According to another aspect, in the tubular vibration damping device described above, an axial end of the tubular part on a side opposite the flange is a press fit tip of a tubular shape continuous over an entire circumference. An outer peripheral surface of the press fit tip is exposed without being covered with the press fit rubber.

According to the tubular vibration damping device configured according to the present aspect, since the press fit tip that serves as a press fit tip side during press fitting into the mounting hole has a tubular shape continuous over the entire circumference without notches or the like, for example, by the press fit tip coming into contact with an inner peripheral surface of the mounting hole over the entire circumference, the outer tube member and the mounting hole are positioned, making it easy to press fit the outer tube member into the mounting hole in an appropriate direction. Since the outer peripheral surface of the press fit tip is exposed without being covered with the press fit rubber, frictional resistance in the initial stage of press fitting is reduced.

According to the disclosure, the outer tube member made of synthetic resin and the mounting hole can be accurately positioned in the axial direction while a press fit fixing force of the outer tube member to the mounting hole is stably exerted.

An embodiment of the disclosure will be described below with reference to the drawings.

FIG. 1 to FIG. 6 illustrate a tubular vibration damping device 10 as a first embodiment of the disclosure. The tubular vibration damping device 10 has a structure in which an inner shaft member 12 and an outer tube member 14 are connected by a body rubber elastic body 16. In the following description, as a general rule, "up-down direction" refers to an up-down direction in FIG. 1, "left-right direction" refers to a left-right direction in FIG. 1, and "front-rear direction" refers to an up-down direction in FIG. 2.

The inner shaft member 12 has a large-thickness, small-diameter, substantially cylindrical shape, and includes a center hole 18 circular in cross section penetrating in an axial direction. The inner shaft member 12 is a hard member made of, for example, metal or synthetic resin.

Figure 7:
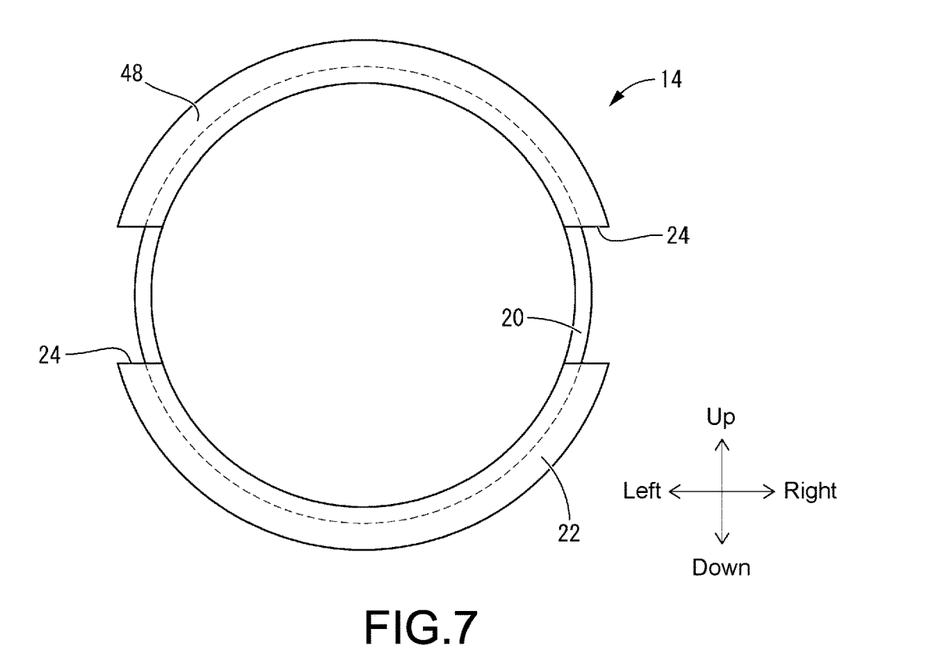
FIG. 7 is a front view of an outer tube member that constitutes the tubular vibration damping device illustrated in FIG. 1.
Figure 8:
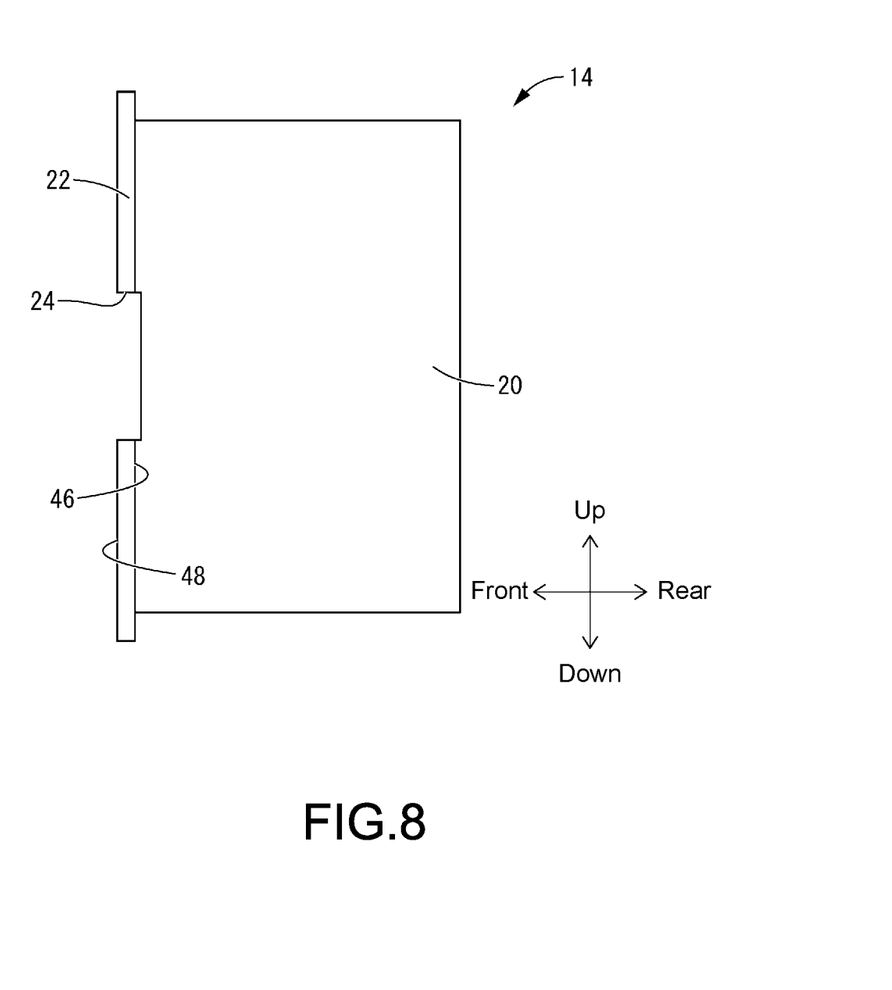
FIG. 8 is a right side view of the outer tube member illustrated in FIG. 7.

As also illustrated in FIG. 7 and FIG. 8, the outer tube member 14 has a small-thickness, large-diameter, substantially cylindrical shape as a whole. The outer tube member 14 integrally includes a tubular part 20 of a cylindrical shape, and a flange 22 of an annular plate shape protruding toward an outer periphery at one axial end (front end) of the tubular part 20. In other words, the outer tube member 14 has a structure in which the tubular part 20 of a cylindrical shape extends from an inner peripheral end of the flange 22 of an annular plate shape toward the other side (rear side) in the axial direction. The outer tube member 14 is a hard member made of synthetic resin such as polyamide (PA), polypropylene (PP), and polytetrafluoroethylene (PTFE).

A pair of notches 24, 24 are formed at the one axial end (front end) of the outer tube member 14 where the flange 22 is provided. The notch 24 is formed penetrating a front end portion of the tubular part 20 and the flange 22 in a radial direction. Accordingly, the notch 24 has a rectangular groove shape extending in the radial direction at the front end portion of the tubular part 20, and the flange 22 is divided by the notch 24 in a circumferential direction. In the present embodiment, the pair of notches 24, 24 are arranged facing each other in the radial direction, and the flange 22 is divided into two in the circumferential direction by the pair of notches 24, 24.

The inner shaft member 12 is arranged in an internally inserted state with respect to the outer tube member 14, and the body rubber elastic body 16 is formed between the inner shaft member 12 and the outer tube member 14. The body rubber elastic body 16 has a substantially cylindrical shape as a whole, has an inner peripheral surface adhered to an outer peripheral surface of the inner shaft member 12 by vulcanization, and has an outer peripheral surface adhered to an inner peripheral surface of the tubular part 20 of the outer tube member 14 by vulcanization.

In the body rubber elastic body 16, a hollowed groove 26 extending annularly in the circumferential direction is formed open on each of both end faces in the axial direction. A pair of hollowed holes 28, 28 are formed penetrating the body rubber elastic body 16 in the axial direction. The hollowed hole 28 is formed on both sides of the inner shaft member 12 in the up-down direction, extends in the left-right direction, and has both left and right ends extending to the outside of the inner shaft member 12 in the left-right direction.

Vertically between the pair of hollowed holes 28, 28 in the body rubber elastic body 16, a pair of rubber arms 30, 30 are formed extending in the left-right direction and connecting the inner shaft member 12 and the outer tube member 14 in the left-right direction. The pair of rubber arms 30, 30 are provided so as to connect an inner peripheral tubular part 34 fixed to the outer peripheral surface of the inner shaft member 12 and an outer peripheral tubular part 36 fixed to the inner peripheral surface of the outer tube member 14 to each other in the left-right direction. An axial end face of the rubber arm 30 is constituted by a bottom surface of the hollowed groove 26. The inner peripheral tubular part 34 and the outer peripheral tubular part 36 protrude from the axial end face of the rubber arm 30 in the axial direction.

Vertically outside the pair of hollowed holes 28, 28 in the body rubber elastic body 16, a pair of stopper rubbers 32, 32 are formed protruding vertically inward from the outer tube member 14 toward the inner shaft member 12. A relative displacement amount in the up-down direction between the inner shaft member 12 and the outer tube member 14 is limited by contact between the stopper rubber 32 and the inner shaft member 12.

A press fit rubber 38 is fixed to an outer peripheral surface of the tubular part 20 of the outer tube member 14. As illustrated in FIG. 2 to FIG. 6, the press fit rubber 38 integrally includes a plurality of circumferential rubbers 40 extending annularly in the circumferential direction and a plurality of axial rubbers 42 extending in the axial direction between the plurality of circumferential rubbers 40.

The circumferential rubber 40 has a substantially constant cross section and has an annular shape continuously extending over the entire circumference in the circumferential direction. In the circumferential rubber 40 of the present embodiment, a rear end portion that serves as a press fit tip side is taken as a tapered part 44 decreasing in diameter toward the rear side, and a front end portion that serves as a press fit rear end side extends in the axial direction with a substantially constant outer diameter. In the present embodiment, three circumferential rubbers 40a, 40b, and 40c are provided separated from each other in the axial direction.

The circumferential rubber 40a located on the front side is separated rearwardly in the axial direction from the flange 22 of the outer tube member 14. A rear surface of the flange 22 is taken as a contact surface 46 exposed to the outside without being covered with the press fit rubber 38. A front surface of the flange 22 is taken as a pressing surface 48 that, like the contact surface 46, is exposed to the outside without being covered with rubber.

The circumferential rubber 40c located on the rear side is separated forwardly from a rear end of the tubular part 20, and a portion of the tubular part 20 on the rear side of the circumferential rubber 40c is exposed without being covered with the press fit rubber 38. This rear end portion of the tubular part 20 that is exposed without being covered with the press fit rubber 38 is taken as a press fit tip 50 of a tubular shape continuous over the entire circumference. Accordingly, the tubular part 20 has the flange 22 provided at one axial end (front end) thereof, and has the other axial end (rear end) thereof taken as the press fit tip 50. An outer peripheral surface of the press fit tip 50 of the present embodiment has a substantially constant diameter over the entire length in the axial direction. However, for example, the press fit tip 50 may have a tapered surface decreasing in diameter toward the rear end that serves as the press fit tip, so as to exhibit a guiding function when being press fitted into a mounting hole 62 described later.

The axial rubber 42 extends linearly in the axial direction, and a plurality of axial rubbers 42 are provided separated from each other in the circumferential direction. A plurality of axial rubbers 42 are provided between the circumferential rubber 40a and the circumferential rubber 40b in the axial direction and between the circumferential rubber 40b and the circumferential rubber 40c in the axial direction. The axial rubber 42 provided between the circumferential rubber 40a and the circumferential rubber 40b have both axial ends integrally connected to the circumferential rubber 40a and the circumferential rubber 40b, connecting the circumferential rubber 40a and the circumferential rubber 40b to each other. The axial rubber 42 provided between the circumferential rubber 40b and the circumferential rubber 40c have both axial ends integrally connected to the circumferential rubber 40b and the circumferential rubber 40c, connecting the circumferential rubber 40b and the circumferential rubber 40c to each other. A protrusion dimension of the axial rubber 42 from the tubular part 20 is less than a maximum protrusion dimension of the circumferential rubber 40 from the tubular part 20.

Since a molding die is removed in the left-right direction, both circumferential side surfaces of the axial rubber 42 have a shape so as not to form an undercut during demolding in the left-right direction. The axial rubber 42 located in the center in the up-down direction has a width dimension in the circumferential direction greater than that of any other axial rubber 42, preferably at least twice that of any other axial rubber 42.

In a portion surrounded by the circumferential rubber 40 and the axial rubber 42, the outer peripheral surface of the tubular part 20 may be exposed, or the outer peripheral surface of the tubular part 20 may be covered with a thin rubber layer.

The pair of rubber arms 30, 30 are positioned in the circumferential direction with respect to the pair of notches 24, 24 in the outer tube member 14. The pair of notches 24, 24 are located on the respective outer peripheral sides of the pair of rubber arms 30, 30. A circumferential width dimension of the notch 24 is desirably equal to or less than that of an outer peripheral end of the rubber arm 30. A circumferential center of the notch 24 and a circumferential center of the rubber arm 30 desirably coincide with each other, and are located in the center in the up-down direction in the present embodiment. The notch 24 and the rubber arm 30 are desirably separated from each other in the axial direction in a projection in an axis-perpendicular direction (left-right direction). A bottom surface of the notch 24 is desirably located in front of a front end surface of the rubber arm 30 (bottom surface of the hollowed groove 26).

A connecting rubber 52 that connects the body rubber elastic body 16 and the press fit rubber 38 is fixed to the notch 24. A illustrated in FIG. 4, the connecting rubber 52 is provided extending in the radial direction within the notch 24, has an inner peripheral side integrally connected with the outer peripheral tubular part 36 of the body rubber elastic body 16 and has an outer peripheral side integrally connected with the press fit rubber 38. In short, in the present embodiment, the body rubber elastic body 16, the press fit rubber 38, and the connecting rubber 52 are integrally formed. As is clear from the fact that the notch 24 is formed on each outer peripheral side of the pair of rubber arms 30, 30, the connecting rubber 52 of the present embodiment is provided on the outer peripheral side of each of the pair of rubber arms 30, 30, and a pair of connecting rubbers 52, 52 have substantially the same shape (symmetrical shape) as each other.

The connecting rubber 52 includes an outer peripheral protrusion 54 protruding toward the outer periphery. The outer peripheral protrusion 54 is provided in a portion of the flange 22 divided by the notch 24, and both ends of the outer peripheral protrusion 54 in the circumferential direction are fixed to a circumferential end face of the flange 22. The outer peripheral protrusion 54 protrudes further to the outer periphery than an outer peripheral end of the press fit rubber 38 (circumferential rubber 40). The outer peripheral protrusion 54 of the connecting rubber 52 has a smaller thickness dimension in the front-rear direction than the flange 22. The outer peripheral protrusion 54 of the connecting rubber 52 is provided within the range of the thickness of the flange 22 without protruding to either side in the front-rear direction with respect to the flange 22. The connecting rubber 52 is provided in the notch 24 without protruding outwardly from the flange 22 in the front-rear direction.

Figure 3:
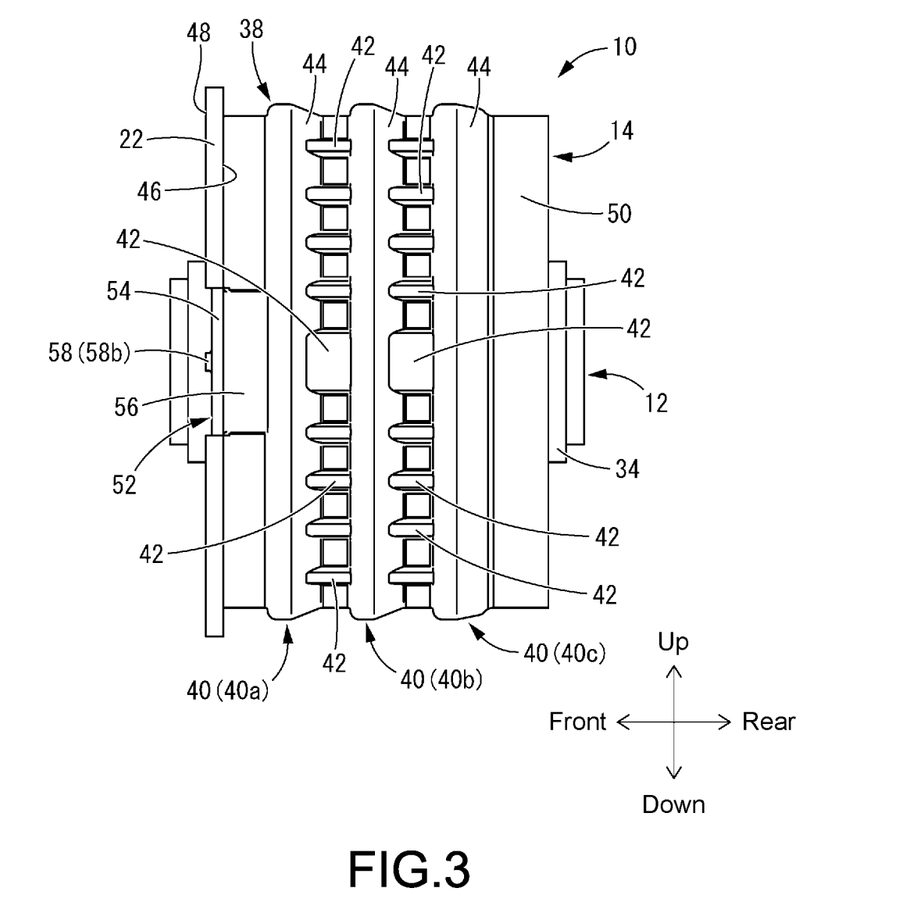
FIG. 3 is a right side view of the tubular vibration damping device illustrated in FIG. 1.
Figure 4:
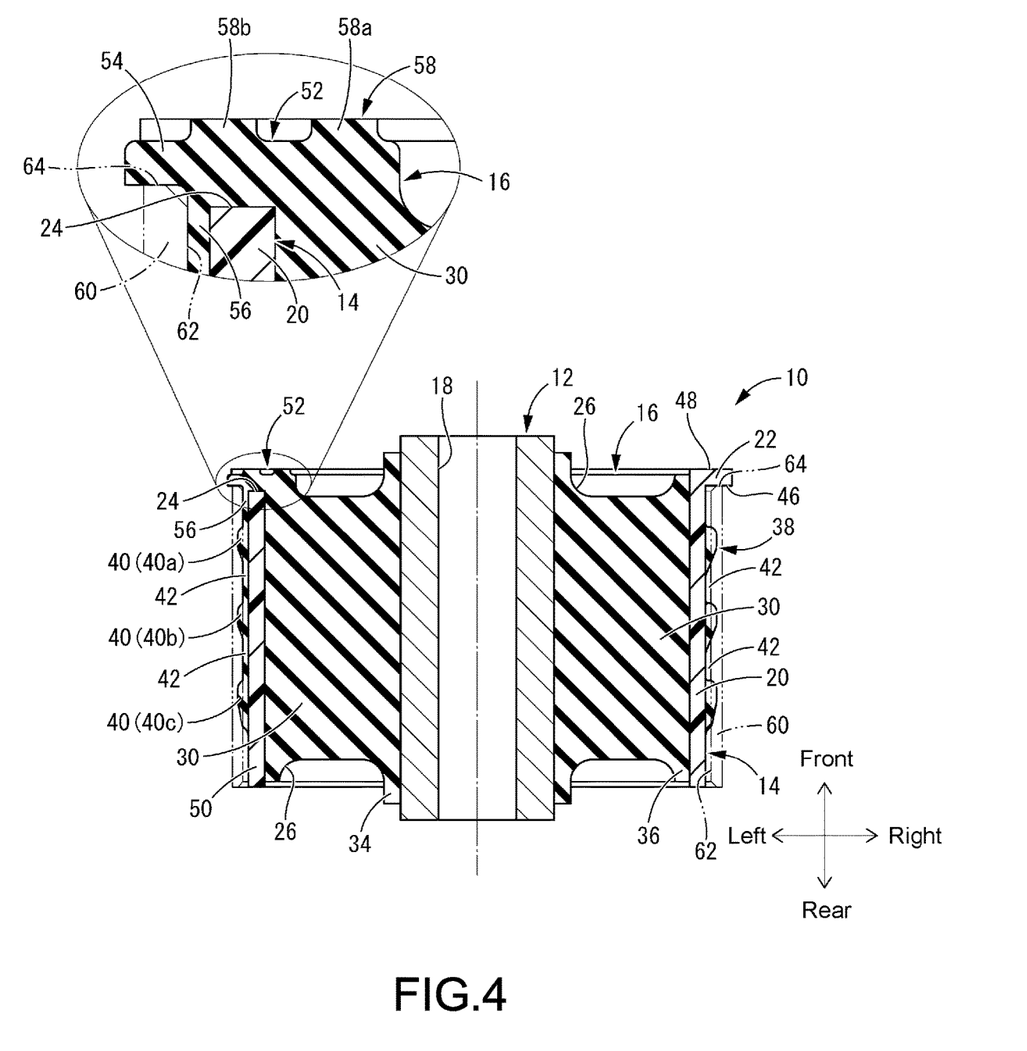
FIG. 4 is a cross-sectional view taken along IV-IV of FIG. 1.

As illustrated in FIG. 3 and FIG. 4, the connecting rubber 52 extends in the axial direction from the notch 24 and is connected to the circumferential rubber 40a by a connection rubber 56 fixed to the outer peripheral surface of the tubular part 20 of the outer tube member 14. The connection rubber 56 that constitutes the press fit rubber 38 extends linearly in the axial direction with substantially the same circumferential width dimension as the notch 24. A protrusion dimension of the connection rubber 56 from the tubular part 20 is desirably equal to or less than a protrusion dimension of the circumferential rubber 40 from the tubular part 20. In the present embodiment, the protrusion dimension of the connection rubber 56 from the tubular part 20 is substantially equal to the protrusion dimension of the axial rubber 42 from the tubular part 20. The outer peripheral protrusion 54 of the connecting rubber 52 protrudes to the outer peripheral side from the connection rubber 56. In the present embodiment, the connecting rubber 52 includes a portion covering an upper end face of a portion in the tubular part 20 where the notch 24 is formed, and a portion (outer peripheral protrusion 54) fixed to a circumferential end face of a portion in the flange 22 where the notch 24 is formed. The outer peripheral protrusion 54 of the present embodiment is provided in the portion of the flange 22 of the outer tube member 14 divided by the notch 24 as described above, and includes not only a portion protruding from an outer peripheral surface of the connection rubber 56 but also a portion located above the connection rubber 56 in FIG. 4.

Figure 1:
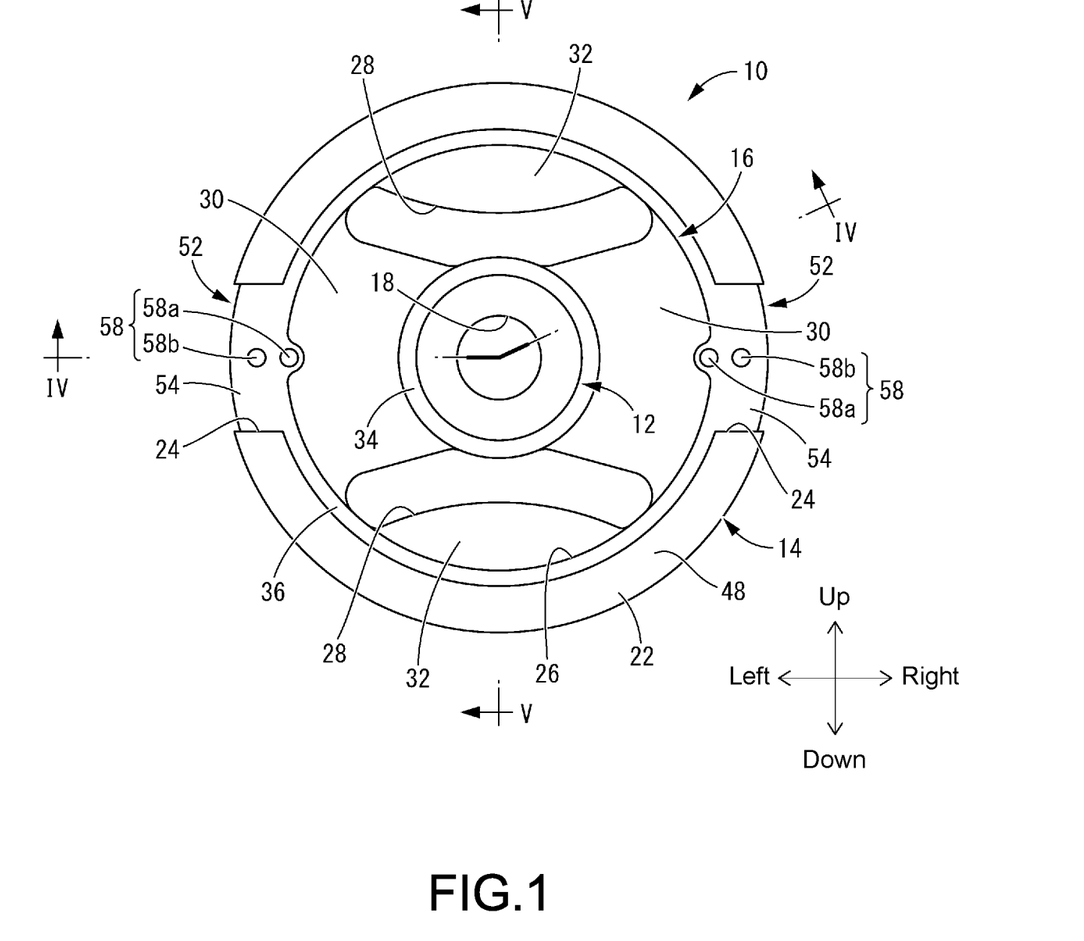
FIG. 1 is a front view illustrating a tubular vibration damping device as a first embodiment of the disclosure.
Figure 2:
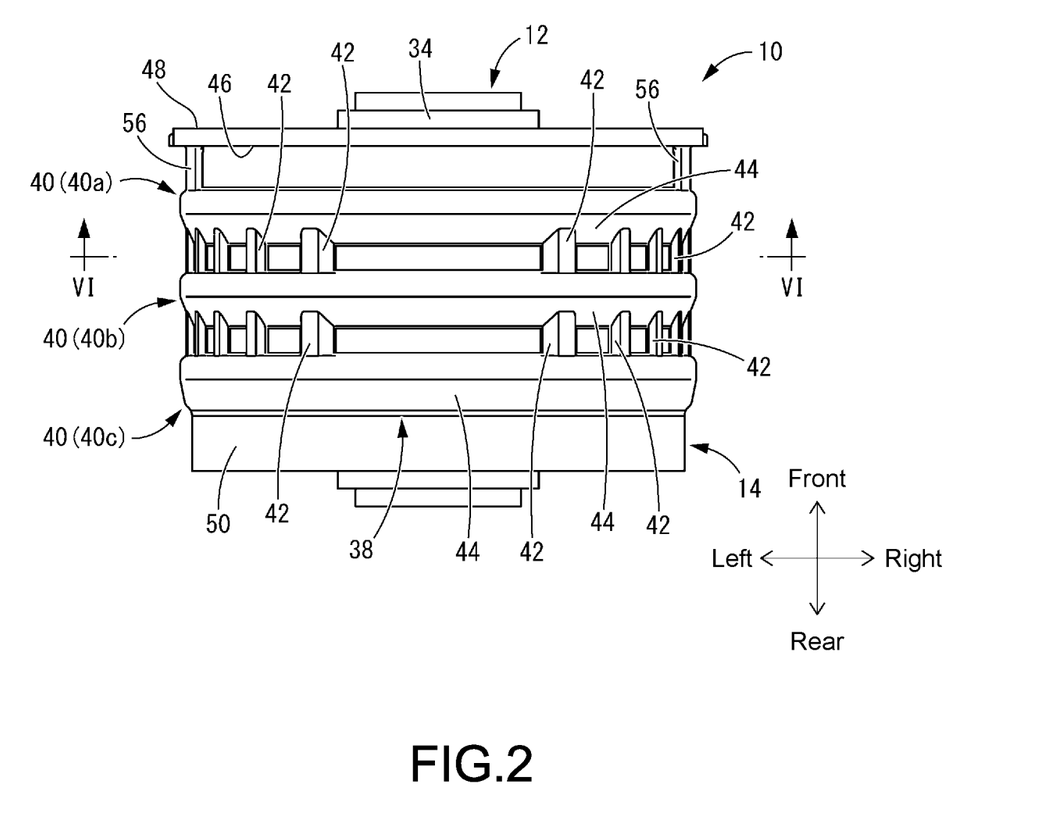
FIG. 2 is a bottom view of the tubular vibration damping device illustrated in FIG. 1.

As illustrated in FIG. 1 and FIG. 4, an injection gate mark 58 being a trace of an injection gate of a rubber material is provided protruding from an upper surface of the outer peripheral tubular part 36 of the body rubber elastic body 16 and the connecting rubber 52. The injection gate mark 58 includes an inner peripheral injection gate mark 58a provided on the inner peripheral side and an outer peripheral injection gate mark 58b provided on the outer peripheral side, and is provided on the respective outer peripheral sides (left and right outsides) of the pair of rubber arms 30, 30. At least a portion of the inner peripheral injection gate mark 58a is located on the inner peripheral side of the tubular part 20 of the outer tube member 14. Preferably, the entire inner peripheral injection gate mark 58a is located on the inner peripheral side of the outer peripheral surface of the tubular part 20. At least a portion of the outer peripheral injection gate mark 58b is located on the outer peripheral side of the tubular part 20 of the outer tube member 14. Preferably, the entire outer peripheral injection gate mark 58b is located on the outer peripheral side of the inner peripheral surface of the tubular part 20. At least a portion of the outer peripheral injection gate mark 58b is provided protruding from the outer peripheral protrusion 54. At least a portion of the outer peripheral injection gate mark 58b desirably overlaps the connection rubber 56 in an axial projection of the outer peripheral injection gate mark 58b. The inner peripheral injection gate mark 58a and the outer peripheral injection gate mark 58b are arranged side by side in the radial direction in the same position as each other in the circumferential direction, and are arranged apart from each other in the radial direction (left-right direction).

When the body rubber elastic body 16, the press fit rubber 38 and the connecting rubber 52 are subjected to integral vulcanization molding, with the inner shaft member 12 and the outer tube member 14 set in the molding die, the rubber material is injected from the position of the injection gate mark 58 into a cavity of the molding die. Accordingly, the rubber material injected from an inner peripheral injection gate that forms the inner peripheral injection gate mark 58a mainly forms the body rubber elastic body 16 and the connecting rubber 52 located on the inner peripheral side of the tubular part 20, and the rubber material injected from an outer peripheral injection gate that forms the outer peripheral injection gate mark 58b mainly forms the press fit rubber 38 and the connecting rubber 52 located on the outer peripheral side of the tubular part 20. In this way, by setting, apart from the inner peripheral injection gate for injecting the rubber material into the inner peripheral side of the tubular part 20, the outer peripheral injection gate for injecting the rubber material into the outer peripheral side of the tubular part 20, the press fit rubber 38 thinner than the body rubber elastic body 16 can be efficiently formed, a pressure difference between the inner periphery and the outer periphery of the tubular part 20 when the rubber material is injected is reduced, and deformation of the tubular part 20 is suppressed.

Figure 5:
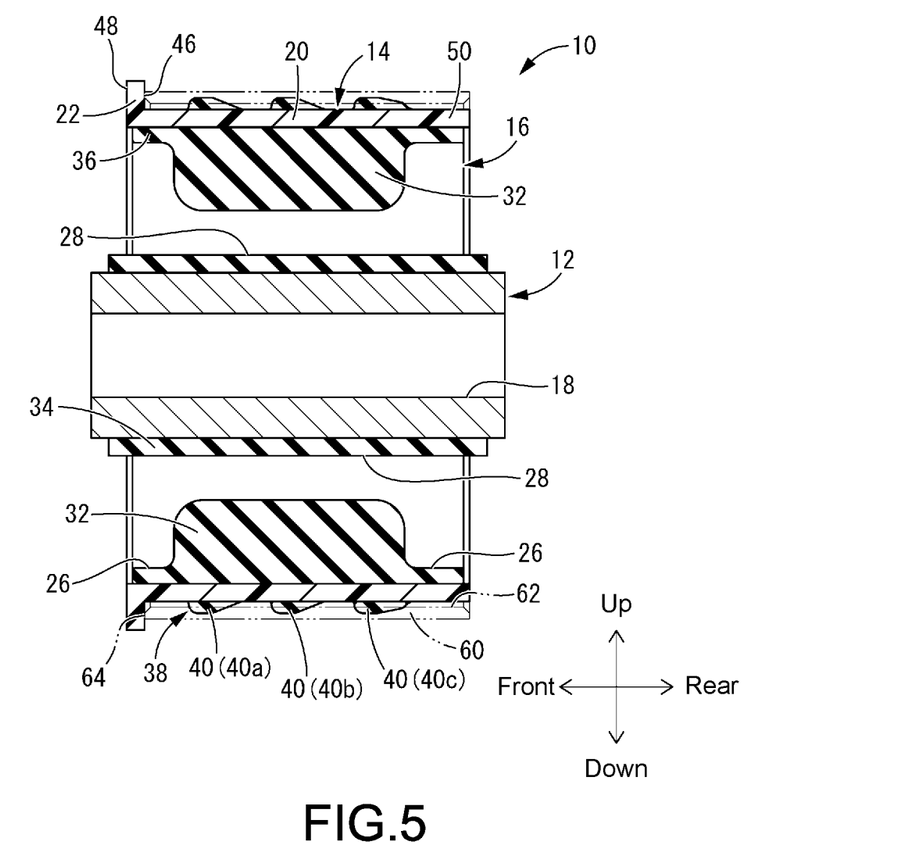
FIG. 5 is a cross-sectional view taken along V-V of FIG. 1.
Figure 6:
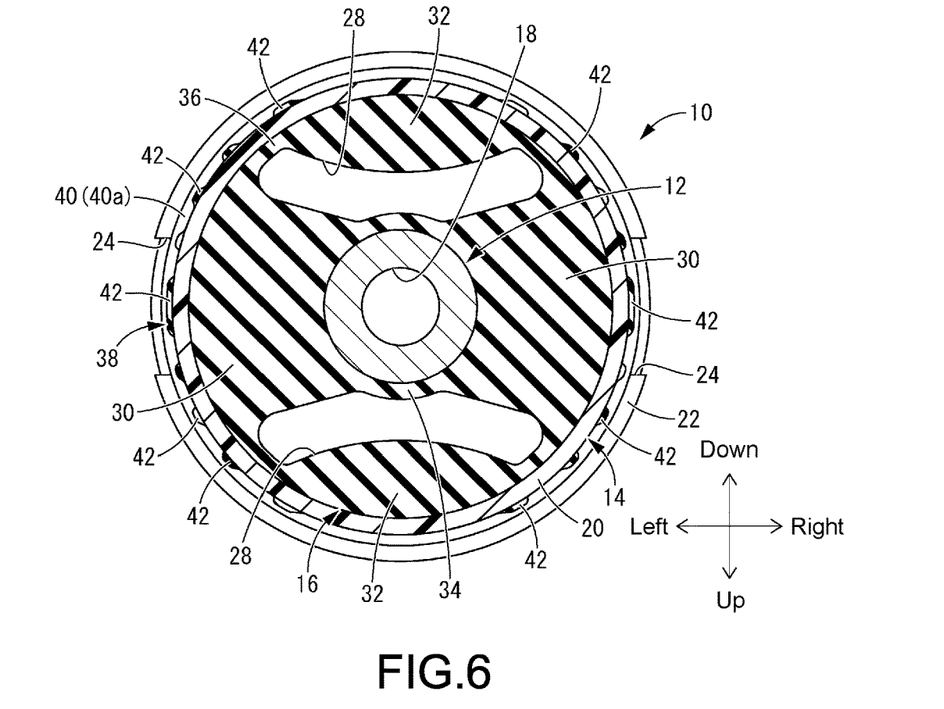
FIG. 6 is a cross-sectional view taken along VI-VI of FIG. 2.

As illustrated in FIG. 4 or FIG. 5, by inserting the outer tube member 14 into the mounting hole 62 provided in an attachment target member 60 such as a vehicle body, the tubular vibration damping device 10 having such a structure is attached to the attachment target member 60. The mounting hole 62 has a diameter larger than an outer diameter of the tubular part 20 of the outer tube member 14 and smaller than a maximum outer diameter of at least the circumferential rubber 40 in the press fit rubber 38. By inserting the tubular part 20 of the outer tube member 14 into the mounting hole 62, the press fit rubber 38 is compressed in the radial direction between the tubular part 20 of the outer tube member 14 and an inner peripheral surface of the mounting hole 62, and the outer tube member 14 is attached in a fixed state to the mounting hole 62 by elasticity of the press fit rubber 38. In this way, since the outer tube member 14 is attached to the mounting hole 62 by rubber press fitting by the press fit rubber 38, a fixing force to the mounting hole 62 is set by spring properties or a compression deformation amount (tightening allowance in the radial direction) of the press fit rubber 38, or the like. Since a press fitting reaction force that acts on the outer tube member 14 is relieved by the press fit rubber 38, even if the outer tube member 14 is made of synthetic resin, plastic deformation (settling) of the outer tube member 14 due to continuous action of the press fitting reaction force is suppressed, and a decrease in the fixing force (falling out resistance) due to settling of the outer tube member 14 is less likely to become a problem.

The flange 22 of the outer tube member 14 comes into contact with an opening end face 64 of the mounting hole 62. Accordingly, a position of the outer tube member 14 in the axial direction relative to the mounting hole 62 is defined. An overlapping surface of the flange 22 on the opening end face 64 of the mounting hole 62 is the contact surface 46 that is exposed without being covered with the press fit rubber 38, and the flange 22 overlaps the opening end face 64 of the mounting hole 62 while in direct contact therewith. Accordingly, no rubber is compressed between the overlapping surfaces of the contact surface 46 of the flange 22 and the opening end face 64 of the mounting hole 62, the outer tube member 14 is prevented from falling out of the mounting hole 62 due to the elasticity of the rubber, and the outer tube member 14 is accurately positioned with respect to the mounting hole 62 in the axial direction.

The outer peripheral protrusion 54 of the connecting rubber 52 provided between the flanges 22 in the circumferential direction does not protrude from the contact surface 46 of the flange 22, and contacts without being pressed against, or is separated from, the opening end face 64 of the mounting hole 62. In the present embodiment, as enlarged in FIG. 4, the outer peripheral protrusion 54 contacts without being strongly pressed against the opening end face 64 of the mounting hole 62.

By pressing the contact surface 46 of the flange 22 and the pressing surface 48 on the opposite side with a jig, the outer tube member 14 to which the press fit rubber 38 is fixed can be rubber press fitted into the mounting hole 62. In this case, since the pressing surface 48 of the flange 22 is exposed without being covered with rubber, a force to be applied from the jig to the outer tube member 14 will not be relieved by deformation of rubber, the force is efficiently applied and press fitting work can be performed.

Since an end on the press fit tip side of the outer tube member 14 is taken as the press fit tip 50 continuous over the entire circumference without being provided with a notch or the like, in the initial stage of press fitting in which only the press fit tip 50 is inserted into the mounting hole 62, inclination of the outer tube member 14 with respect to the attachment target member 60 or the like is prevented, and the outer tube member 14 and the attachment target member 60 can be positioned in an appropriate direction.

The outer peripheral surface of the press fit tip 50 of the outer tube member 14 is exposed to the outside without being covered with rubber. Hence, in the initial stage of press fitting, the press fit tip 50 having an outer diameter smaller than an inner diameter of the mounting hole 62 can be easily inserted into the mounting hole 62, and frictional resistance in the initial stage of press fitting is suppressed.

The press fit rubber 38 of the present embodiment has a structure in which a plurality of circumferential rubbers 40 and a plurality of axial rubbers 42 are combined. Thereby, a spring constant when the press fit rubber 38 is compressed between the tubular part 20 of the outer tube member 14 and the inner peripheral surface of the mounting hole 62 in the radial direction is adjusted, and a force required during press fitting can be reduced while a required fixing force by rubber press fitting is secured. In particular, since a maximum protrusion height dimension of the circumferential rubber 40 is larger than a maximum protrusion height dimension of the axial rubber 42, a resistance against the outer tube member 14 falling out of the mounting hole 62 in the axial direction is efficiently exerted. Moreover, since a tip portion in a press fitting direction of the circumferential rubber 40 is taken as the tapered part 44 decreasing in diameter toward the press fit tip side, the falling out resistance can be secured while the resistance at the time of press fitting is suppressed.

Although the embodiments of the disclosure have been described in detail above, the disclosure is not limited by the specific description thereof. For example, the notch 24 may be provided only on the outer peripheral side of either one of the rubber arms 30. The notch 24 may not necessarily be positioned with the rubber arm 30 in the circumferential direction, and can be provided, for example, on the outer peripheral side of the stopper rubber 32. In this case, the connecting rubber 52 provided in the notch 24 may, for example, be provided continuously on the outer peripheral side of the stopper rubber 32.

In the body rubber elastic body 16, neither the pair of hollowed holes 28, 28 nor the pair of rubber arms 30, 30 extending between the hollowed holes 28, 28 are essential. For example, there may be formed only one hollowed hole 28, or a body rubber elastic body may be adopted that has no hollowed hole 28 and connects the inner shaft member 12 and the outer tube member 14 to each other over the entire circumference.

The press fit rubber 38 may not necessarily have a structure in which the circumferential rubber 40 and the axial rubber 42 are combined as illustrated in the above embodiment. For example, the press fit rubber 38 may have a substantially constant cross section and a tubular shape extending over the entire circumference.

The injection gate mark 58 may include only either the inner peripheral injection gate mark 58a or the outer peripheral injection gate mark 58b. For example, the injection gate mark 58 may include only the inner peripheral injection gate mark 58a. The inner peripheral injection gate mark 58a and the outer peripheral injection gate mark 58*b* may be provided in different positions from each other in the circumferential direction. For example, either one of the inner peripheral injection gate mark 58*a* and the outer peripheral injection gate mark 58*b* may be provided on the outer peripheral side of the stopper rubbers 32, 32. Furthermore, the injection gate mark 58 may include an injection gate mark other than the inner peripheral injection gate mark 58*a* and the outer peripheral injection gate mark 58*b*. The position or number of injection gates may be appropriately changed and set in consideration of filling properties of the rubber material according to the shape or the like of rubber to be molded. It is also possible to connect the inner peripheral injection gate mark 58*a* and the outer peripheral injection gate mark 58*b* in the above embodiment in the radial direction to form one injection gate mark.

The disclosure can also be applied to a fluid-filled tubular vibration damping device including a fluid chamber in which an incompressible fluid is sealed.

What is claimed is:

1. A tubular vibration damping device, having a structure in which an inner shaft member is connected with an outer tube member made of synthetic resin by a body rubber elastic body, wherein
   the outer tube member has a structure in which a tubular part extends in an axial direction from an inner peripheral end of a flange of an annular plate shape;
   a press fit rubber is fixed to an outer peripheral surface of the tubular part, and an axial surface of the flange on a side from which the tubular part extends is exposed without being covered with the press fit rubber;
   a notch penetrating in a radial direction is provided at an axial end of the outer tube member that comprises the flange; and
   a connecting rubber that connects the body rubber elastic body and the press fit rubber is provided in the notch.

2. The tubular vibration damping device according to claim 1, wherein
   the connecting rubber is provided in the notch without protruding axially outward with respect to the flange.

3. The tubular vibration damping device according to claim 1, wherein
   a pair of hollowed holes are formed on both radial sides of the inner shaft member in the body rubber elastic body;
   the body rubber elastic body is provided with a pair of rubber arms each extending in the radial direction between the pair of hollowed holes in a circumferential direction and connecting the inner shaft member and the outer tube member to each other; and
   the connecting rubber is arranged on an outer peripheral side of each of the rubber arms.

4. The tubular vibration damping device according to claim 1, wherein
   an outer peripheral protrusion of the connecting rubber protruding toward an outer periphery from the press fit rubber is provided between circumferential ends of the flange in the notch; and
   an injection gate mark of a rubber material during molding of the connecting rubber is formed in the outer peripheral protrusion.

5. The tubular vibration damping device according to claim 1, wherein
   an axial end of the tubular part on a side opposite the flange is a press fit tip of a tubular shape continuous over an entire circumference, and an outer peripheral surface of the press fit tip is exposed without being covered with the press fit rubber.

* * * * *